United States Patent
Soman et al.

(10) Patent No.: US 11,647,003 B2
(45) Date of Patent: *May 9, 2023

(54) CONCEALING INTERNAL APPLICATIONS THAT ARE ACCESSED OVER A NETWORK

(71) Applicant: VMWARE, INC., Palo Alto, CA (US)

(72) Inventors: Sisimon Soman, Sunnyvale, CA (US); Arun P C, Singapore (SG)

(73) Assignee: VMWARE, INC., Palo Alto, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/509,315

(22) Filed: Oct. 25, 2021

(65) Prior Publication Data

US 2022/0045992 A1 Feb. 10, 2022

Related U.S. Application Data

(63) Continuation of application No. 16/715,614, filed on Dec. 16, 2019, now Pat. No. 11,190,493.

(51) Int. Cl.
*H04L 9/40* (2022.01)

(52) U.S. Cl.
CPC ...... *H04L 63/0281* (2013.01); *H04L 63/0236* (2013.01); *H04L 63/0407* (2013.01); *H04L 63/0876* (2013.01); *H04L 63/166* (2013.01)

(58) Field of Classification Search
CPC ............. H04L 63/0281; H04L 63/0236; H04L 63/0407; H04L 63/0876; H04L 63/166; H04L 63/029; H04L 63/108

See application file for complete search history.

(56) References Cited

U.S. PATENT DOCUMENTS

| | | | |
|---|---|---|---|
| 6,754,716 B1 | 6/2004 | Sharma | |
| 7,594,268 B1* | 9/2009 | Sobel | H04L 63/105 709/224 |
| 8,537,841 B2 | 9/2013 | Takeyoshi | |
| 2003/0110273 A1* | 6/2003 | Ventura | H04L 63/10 709/229 |
| 2005/0132060 A1* | 6/2005 | Mo | H04L 51/212 709/227 |
| 2008/0184344 A1 | 7/2008 | Hernacki | |
| 2009/0228972 A1 | 9/2009 | Bandi | |
| 2018/0109497 A1* | 4/2018 | Claes | H04L 63/0236 |
| 2018/0241718 A1 | 8/2018 | Stair | |
| 2020/0153719 A1 | 5/2020 | Chauhan | |

* cited by examiner

*Primary Examiner* — Amie C. Lin
(74) *Attorney, Agent, or Firm* — Clayton, McKay & Bailey, PC (57) ABSTRACT

Examples herein describe systems and methods for concealing internal applications that are accessed over the internet. A user device can select a remote internal application to access using a client. The user device can send an access request to an open listening port of an access server. The access server can be a gateway and proxy to the internal application, which can reside elsewhere. The access server can open a different randomized access port for establishing the connection by proxy to the internal application. The port number for the access port can be identified in the access request at the listening port. The access server can open the access port for a short time interval. The connection can be made through the access port during that time interval. A firewall can then close the access port but maintain an established connection between the user device and the internal application.

20 Claims, 5 Drawing Sheets

CONCEALING INTERNAL APPLICATIONS THAT ARE ACCESSED OVER A NETWORK

This application claims priority to and is a continuation of U.S. patent application Ser. No. 16/715,614, titled "CONCEALING INTERNAL APPLICATIONS THAT ARE ACCESSED OVER A NETWORK," filed Dec. 16, 2019, which is incorporated in its entirety by reference for all purposes.

BACKGROUND

In today's mobile-based world, users routinely need to access work applications over the internet. Traditionally, enterprises have used virtual private networks ("VPNs") to provide access over the internet to applications on an internal network. These internal applications: often have few security controls to validate access legitimacy. Instead, they rely on perimeter security features, such as firewalls and VPN gateways, to ensure that only valid clients are allowed access. A client can be an application or process running on a user device remote from the internal network.

However, as applications are migrated from internal networks to the cloud, perimeter-based security becomes insufficient. This is because users are not accessing applications from "internal" network and from a "known managed" device. This makes VPN based solution less effective for mobile-cloud use. In a cloud environment, VPN has fundamental shortcomings with regard to security, user experience, and performance. Additionally, VPN technology extends a datacenter subnet to an endpoint (such as a client), potentially making more resources than necessary available. As a result, malware on the endpoint can potentially affect the resources on the cloud network since they are on the same network when using a VPN. The VPN is also unaware of user and device context. This introduces security risks that fall short of "zero trust" standards for enterprise applications.

To increase security, some enterprises have made cloud-based internal applications accessible using a reverse proxy solution. Reverse proxy technologies retrieve resources on behalf of a client from one or more servers. The client can contact the server, then the resources are returned to the client, appearing as if they originated from the proxy server itself. Typically, an application can be modified for security features, such as multi-factor authentication. The user experience is generally improved compared to VPN due to reduced overhead.

However, simply implementing a reverse proxy is still not an ideal solution. First, modifying internal applications to incorporate reverse proxy processes can be costly and not scalable overall. Additionally, reverse proxy technologies are still susceptible to attacks at open ports in the proxy server. An attacker aiming to compromise a server can perform "reconnaissance," in which the target server is located. This can include determining the address and open ports of the server. With that information, various attacks can then be launched. Current solutions lack a secure way to externalize internal web-based applications without exposing the applications to such attacks from an unknown client.

Therefore, a need exists for concealing internal applications that are accessed over a network. In particular, a need exists for replacing VPN while minimizing endpoint exposure for legacy applications that access resources over the internet.

SUMMARY

Examples described herein include systems and methods for zero trust access to internal applications from over a network, such as the internet. In one example, a user device is enrolled in an enterprise mobility management ("EMM") system. The user cam access multiple managed applications on their user device. The device can run a client portion of the application, which then accesses the internal application (e.g., a web service) remotely over the network. Selecting a client can cause an agent executing on the user device to contact an access server that provides access to internal applications remote from the user device. The access server can act as a proxy to the internal applications. While the user device can know the address of the access server, the address of the internal application (such as, at a web server) can remain hidden.

The access server can receive the access request at a listening port. The access request can be a single packet authentication ("SPA") that is sent to a port specified by the agent or some other EMM functionality installed at the user device. For example, a filter driver in the kernel code of the user device can look up a corresponding address, including a port, and the agent can cause the user device to send an encrypted SPA packet to the listening port. The listening port can be opened in a firewall and received at the access server.

If the user can be authenticated, then the access server can open an access port in the firewall for accessing the internal application. The access port can be randomized and only left open for a brief period, mitigating against detection and exploitation by malicious processes. In one example, the access request can identify a random port number to use as the access port. The access server can then open that access port without requiring any acknowledgement or response to the user device—again mitigating against detection by malicious processes. Alternatively, the access server can reply to the user device with the access port information. The access port can be based on a random number and opened for a time interval of less than fifteen seconds, in an example. In one example, the time interval is set to five seconds.

While the access port is open, the client can access the internal application by connecting with credentials through the access port. For example, an agent can send a key that is recognized by the internal application, which can operate on the same or different server as the access server. The access server can act as a proxy, forwarding commands and credentials to the web server of the internal application.

Once the connection is established, the client (on the user device) can send information back and forth with the internal application (at a hidden web server), allowing the client to run the internal application remotely at the user device. The access server can close the access port without disrupting the connection between the client and the internal application. To do this, the access server can set a firewall rule that by default maintains connections with an established status, but blocks attempts at new connections.

These features can allow a user device to remotely access legacy internal applications in a cloud without the need to rewrite the legacy application, in an example. These features can also provide security based on the randomized access port and short open time window. Additional security can be provided based on managed address filtration at the user device. For example, a management server can provide a whitelist of allowed applications. The agent can identify the application in the whitelist prior to sending an SPA request to the access server. If the connection request is initiated by an application not in the whitelist, the agent or filter driver can block the outgoing connection.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, a system allowed access to internal applications in a cloud from over a network, such as the internet. A client, which can be an application or process, can run on a user device that is located remotely from the internal application that the client runs. In one example, the client is a web browser and the internal application is a web service, but other configurations are also possible.

At the user device, a user can select an application to open. The user device can generate an access request, such as an SPA request, that is received by an access server. The access server can act as an access gateway to one or more internal applications. The access server can provide reverse proxy to those internal applications. The client on the user device can cause the access request to be issued in a format that the access server can understand.

In one example, the client causes an agent on the user device to send the access request to a destination interne protocol ("IP") address and port that the agent retrieves. The agent can be part of the client, operating system ("OS"), or some other stand-alone process. The agent can generate the access request, in an example. In one example, the agent can perform various checks before sending the access request. For example, the agent can first check a whitelist of allowed applications to ensure the user is allowed to access the local application being requested by the client. The agent can also check to ensure that the user device complies with an policy prior to sending the access request. The whitelist and compliance checks can allow the EMM system to manage which applications the user device can access.

The access server can receive the access request at a listening port that is configured to be open at a firewall. The listening port can remain open to receive requests from various clients. The firewall can be part of or in front of the access server, in an example. The access server can receive the access request and authenticate the user device based on the credentials in the access request. If authentication is successful, then the access server can open an access port that is different from the listening port. The access port can be randomized, such as by using a randomly generated number, and can be set to remain open for a brief time period, such as between three and fifteen seconds. This can help prevent detection by malicious processes.

In one example, the access request can identify the random port number to use as the access port. The access server can then open that port without responding to the user device. By remaining silent to requests at the listening port, the access server can mitigate against reconnaissance by malicious processes in an example. Alternatively, the access server can respond to the agent by identifying the access port number in an example.

The agent can contact the internal application at the access port while the access port remains open. In another example, the internal application can contact the agent through the access port using information received by the access server from the access request. In one example, the agent sends credentials to the internal application, which can be a web service. Based on the credentials being verified, the client and internal application can establish a connection with one another. The access port can close at the end of the time interval, but the connection can persist.

Figure 1:
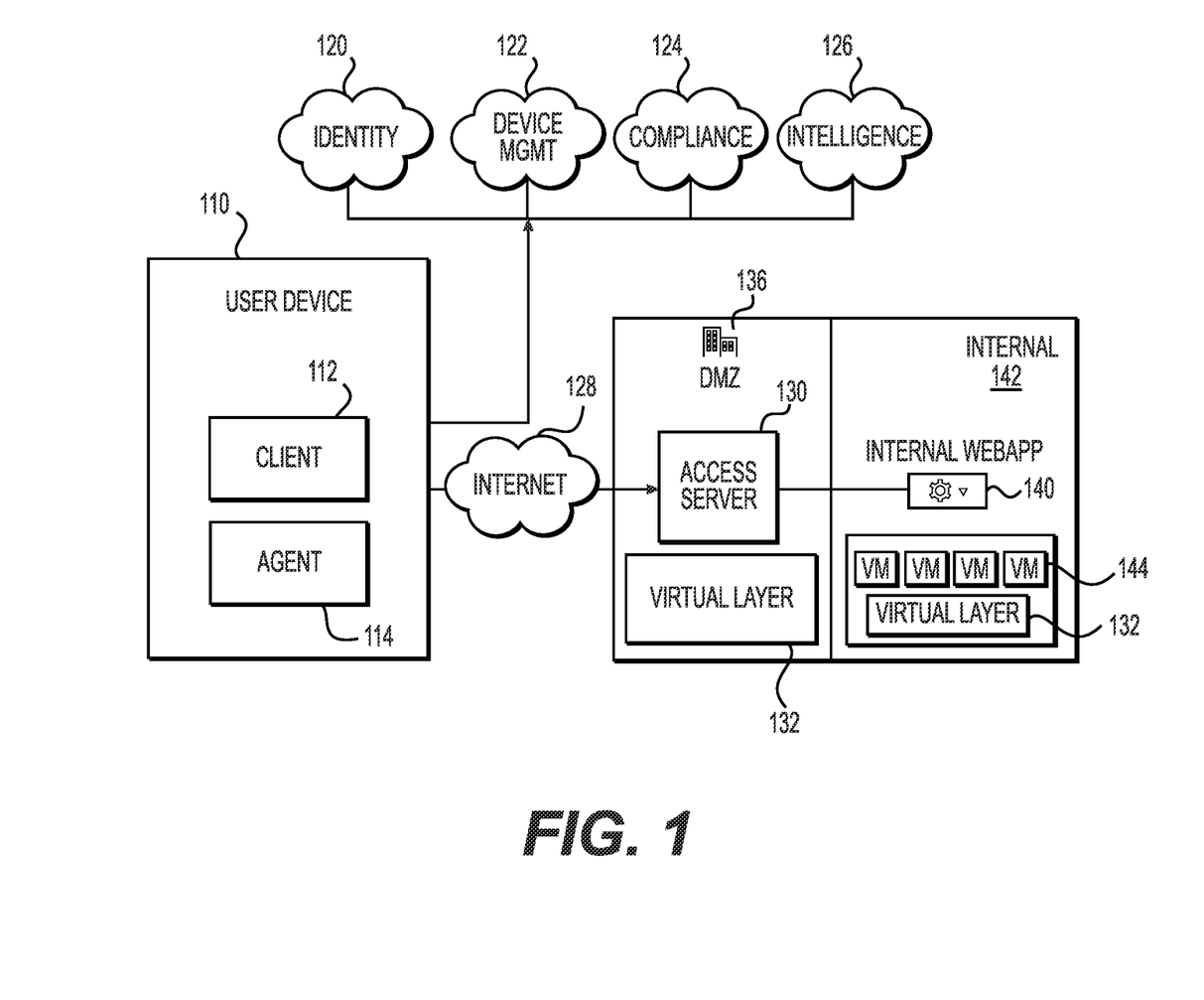
FIG. 1 is an example system diagram including components for providing access to internal applications in a cloud from over a network.

FIG. 1 is an example illustration of system components that can be used for concealing internal applications that are accessed over a network. A user device 110 can execute a client 112 for accessing an internal application over the internet 128. The user device 110 can be any processor-enabled device, such as a tablet, phone, laptop, or computer. The client 112 can be an installed application, such as a browser or a front-end application that contacts the internal application to fully execute. For example, in an EMM system, a suite of managed applications can be installed at the user device 110. These managed applications can be accessed using one or more clients 112 on the user device 110. In one example, icons for the managed applications are presented on the desktop of the device 110. Alternatively, the client 112, such as a web browser, can contact a management server to display which applications the user can open.

An agent 114 can also execute on the user device 110. The agent 114 can be installed as part of enrollment in the EMM system in an example. Alternatively, the agent 114 can be part of the OS of the user device 110 or part of a managed application. The agent 114 can perform various tasks related to the EMM system. These can include identifying the user, managing which applications or application functions are available on the user device 110, ensuring that the user device 110 complies with EMM policies, and providing intelligence for how to remotely open the internal applications.

In one example, the user device 110 can send an access request to an access server 130. The access server 130 can be one or more servers in the cloud that act as proxies to the internal applications. The access server 130 can be physical or can operate virtually in a virtual layer 132 of the network. The virtual layer 132 can include hypervisors and virtual machines ("VMs") 144 that execute on top of physical devices, such as physical servers. The access server 130 can be instantiated as one or more VMs that execute in a demilitarized zone ("DMZ") 136 of the network. The DMZ 136 can be a perimeter network or screened subnet that exposes an enterprise's internal services 142 to an untrusted network, such as the internet 128.

In one example, the access request is sent b the agent 114. The client 112 can utilize the agent 114 to allow the EMM system flexibility in governing access to the internal services 142. The agent 114 can perform multiple verifications prior to sending the access request. The agent 114 can communicate with one or more management servers in the cloud, which can perform various services 120, 122, 124, 126, as described in more detail below.

An intelligence service 126 can provide address and port information for the various applications accessible by the client 112, in an example. The agent 114 can receive this information and store it locally, in an example. A filter driver can be used to match an application against address information for that application. Subject to other verifications that will be discussed, the agent 114 can then cause the user device 110 to issue the access request to the address specified by the filter driver.

The address can include a port that corresponds to an open listening port at the access server 130. This port can be selected by the management server in an example. A firewall in the DMZ 136 can open the listening port. The agent 114 can likewise contact this listening port based on address information received from the management server.

The access request can be an SPA request, in an example. This can include sending an encrypted packet to the listening port. A shared secret can be exchanged between the client 112 (e.g., via the agent 114) and the access server 130. The secret can be provided to both ahead of time from the device management service 122, in an example. In one example, the access request securely communicates random data, a username, a time stamp, and a hash. In one example, the access server 130 can abstain from replying when it cannot verify the SPA request. This silence can prevent the listening port from being revealed to attackers who scan the access server 130 with a port scan. However, if a legitimate client 112 receives no reply (for example, based on timeout) the client 112 can send another SPA request to the access server 130.

When the access request is verified, the access server 130 can open an access port that is different than the listening port. The access port can be randomized. For example, the SPA request can identify a random port for the access server 130 to open for purposes of connecting to the internal application 140 (by proxy through the access server 130). The access port can be randomly generated, such as by generating a random number that is multiplied against a port range to select an access port. The access port can then be opened for a period of time, such as five seconds. Alternatively, the random access port can be selected by the access server 130 and reported to the user device 110 in response to the access request.

Within the time interval that the access port is open, the client 112 can establish a connection with the internal application 140. This can include exchanging keys or other credentials initially using the access port. The access server 130 can stand in as a proxy, issuing communications and credentials back and forth between the endpoints. The access port can close at the end of the time interval, preventing attacks from malicious processes through the access port. However, a firewall rule can allow established connections to remain in effect.

If the user wishes to open another of the internal services 140 (e.g., application) that is reachable through the access server 130, then the client 112 for that service can cause the agent 114 to go through the same process again.

As previously mentioned, an access request can be contingent on multiple verifications involving services 120, 122, 124, 126. For example, the agent 114 can first need to confirm a user's identity, confirm that the user is allowed to use the client 112 or internal application 140, confirm that the user device 110 complies with an EMM policy, and apply intelligence for authenticating the user device 110 with the access server 130 and connecting to the internal application 140. If these verifications succeed, the agent 114 can make the access request to the access server 130, in an example.

In more detail, the agent 114 can communicate with an identity management service 120 and a device management service 122 as part of a zero-trust solution. These services 120, 122 can be provided by one or more servers executing in the cloud, in an example. The agent 114 can contact the identity service 120 to verify the user's identity. This can be done as part of logging the user into the EMM system in an example, such as using single sign-on ("SSO"). The agent 114 itself can be received from a device management service 122. The device management service 122 can also provide a whitelist of which applications are available, in an example (or a blacklist of which applications are unavailable). The agent 114 can check that the internal service 142 being accessed is within the whitelist (or absent from the blacklist) prior to issuing the access request.

The agent 114 likewise can determine whether the user device 112 complies with an EMM compliance policy by checking with a compliance service 124 or a profile received from the compliance service 124. The way in which compliance checks are handled can be defined at an administrative console. For example, if a user device 110 is out of compliance, an administrator can configure what internal services 142 (if any) the user device 110 can use. In one example, the configuration can block the user device from contacting the access server 130 for one or more applications. In another example, the non-compliant user device 110 can still access a low-risk internal service 142 by contacting the access server 130.

The compliance policy can require that certain applications are or are not installed, require certain OS versions, and include a maximum time for the user device 110 to have gone without checking in with the management server, among other things. For example, a compliance rule can require that a filter driver of a particular version be installed on the enrolled user device 110. The filter driver can look up an address and port for the internal service 142 requested by the client 112, in an example.

The compliance policy can also restrict access based on the geo-location of the user device 110 or the time of day at the geo-location. For example, the administrator can set a policy disallowing device usage outside the business location of an enterprise outside of business hours. The compliance policy can also prevent the user device 110 from accessing the access server 130 when the OS is jailbroken or if required encryption settings are not in place. Different users can have different compliance criteria, specified in a profile received by the agent 114 from the device management service 122, in an example.

Figure 2:
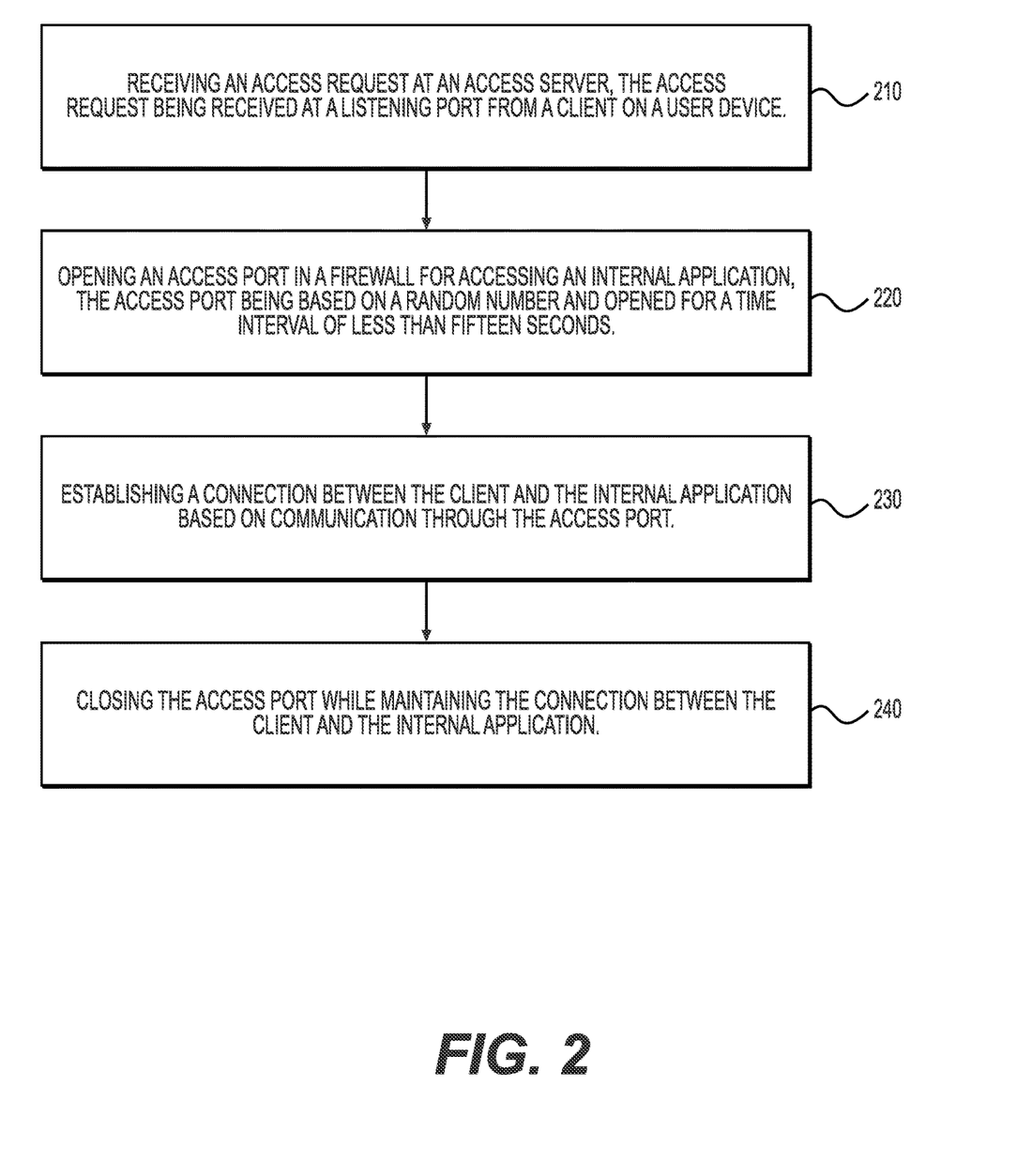
FIG. 2 is a flowchart of an example method for problem prioritization in a Telco cloud.

FIG. 2 is an example flowchart for concealing internal applications that are accessed over the internet. At stage 210, the access server 130 can receive an access request from a user device 110. For example, when the user wants to access an internal application 140 on the internet 128, the user can select an icon for a client 112 on the user device 110. The client 112 can then send an encrypted access request to the access server 130 as a first step in accessing the internal application 140.

The access request can be an SPA request that acts as a knock on the listening port of a firewall for the access server 130. The SPA request can be one or more encrypted packets containing information that identifies the client 112, such as an IP address, username, and a signed passphrase. The encryption can be based on a symmetric cipher and asymmetric encryption from key rings, in an example. In one example, random data is provided as part of the access request. The random data can be used to mitigate the chance of replay attacks. The SPA request can carry a timeout value, so the random data is only valid for so long. After that, the client 112 would need to make a new SPA request, in an example. The agent 114 on the user device 110 can ensure the correct keys are exchanged between the client 112 and access server 130 in an example.

The access server 130 can be running a default-drop firewall policy in one example. In one example, that access server 130 does not acknowledge requests from the client 112 to prevent port scanning. However, an access request sent to the correct port (the listening port) can be received. The listening port can be a port number that is shared by a management server with the user device 110. For example, a filter driver on the user device 110 can be provided with address information for various internal applications. The client 112 can identify the requested internal application 140, and the filter driver can return IP address and a port number. This can allow the client 112 to contact the port number that corresponds to the listening port where the access server 130 is listening for access requests.

An SPA module can execute at the access server 130 for receiving an SPA request from the client 112 (either directly or from another component, such as the agent 114). The access server 130 can run IP tables with firewall rules that do not allow incoming connections to the internal applications 140 by default but keep connections open that are already in an "established" state. Therefore, an open port can be needed to establish the connection, but once the connection is established the port can be closed.

The access server 130 can verify the SPA request, such as by verifying a hash-based message authentication code ("HMAC") and shared key. Once verified, at stage 220, the access server 130 can open an access port in the firewall for accessing an internal application identified by the access request. Once verified, the access server 130 can add an accept rule to the firewall input chain for a short period of time, such as ten seconds before deleting it. This can allow communications through an access port to which the accept rule applies.

To mitigate against attacks, the access port can be randomized. This can make it much more difficult for an attacker to guess which port will be opened after the SPA request is granted, in an example. The access port can be derived from a random number that is generated at either the access server 130 or the client 112, depending on the example. In one example, the random number is provided by the client 112. For example, the client can request an access port with a number from 10,000 to 65,535. As a particular example, the client 112 can include the random port number 10123 as part of the SPA request, in an example. Based on the SPA validation, the access server 130 can open the access port with port number 10123. Therefore, even if an attacker knew that the listening port was open, the attacker would not know which port was then temporarily open for purposes of accessing the internal application 140. Alternatively, the access server can provide the random port number to the client 112. This can be done in response to the SPA request, in an example.

The access port can be opened for a short time interval, such as 15 seconds. To do this, an accept rule can be placed on the firewall that corresponds to the port number of the access port. The accept rule can remain open during the time interval, but automatically close thereafter.

At stage 230, the client 112 can establish a connection with the internal application 140 by communicating through the open access port. The firewall rules can dictate that a connection can only be created while the access port is open. The connection can be a socket or any other connection type, allowing for encrypted flow of data between the client 112 and the internal application 140. The connection can have a status that is read by the firewall or IP tables of the access server 130. The status can be set to established, in an example. In one example, the connection is assigned a status code that represents an established connection for purposes of applying firewall rules.

At stage 240, the access port can be closed when the time interval of the accept rule ends. This can be automatic, and the firewall of the access server 130 can return to the default of not allowing requests at the access port. However, in one example, the default rule for any of the potential access ports (e.g., a range of ports for the purpose of randomization) can be to allow connections that already have an established state. Therefore, the connection between the user device 110 and the internal application 140 can persist in its established state. When the connection ends, however, the client 112 would need to reestablish access by issuing a new access request at stage 210 in an example.

Figure 3:
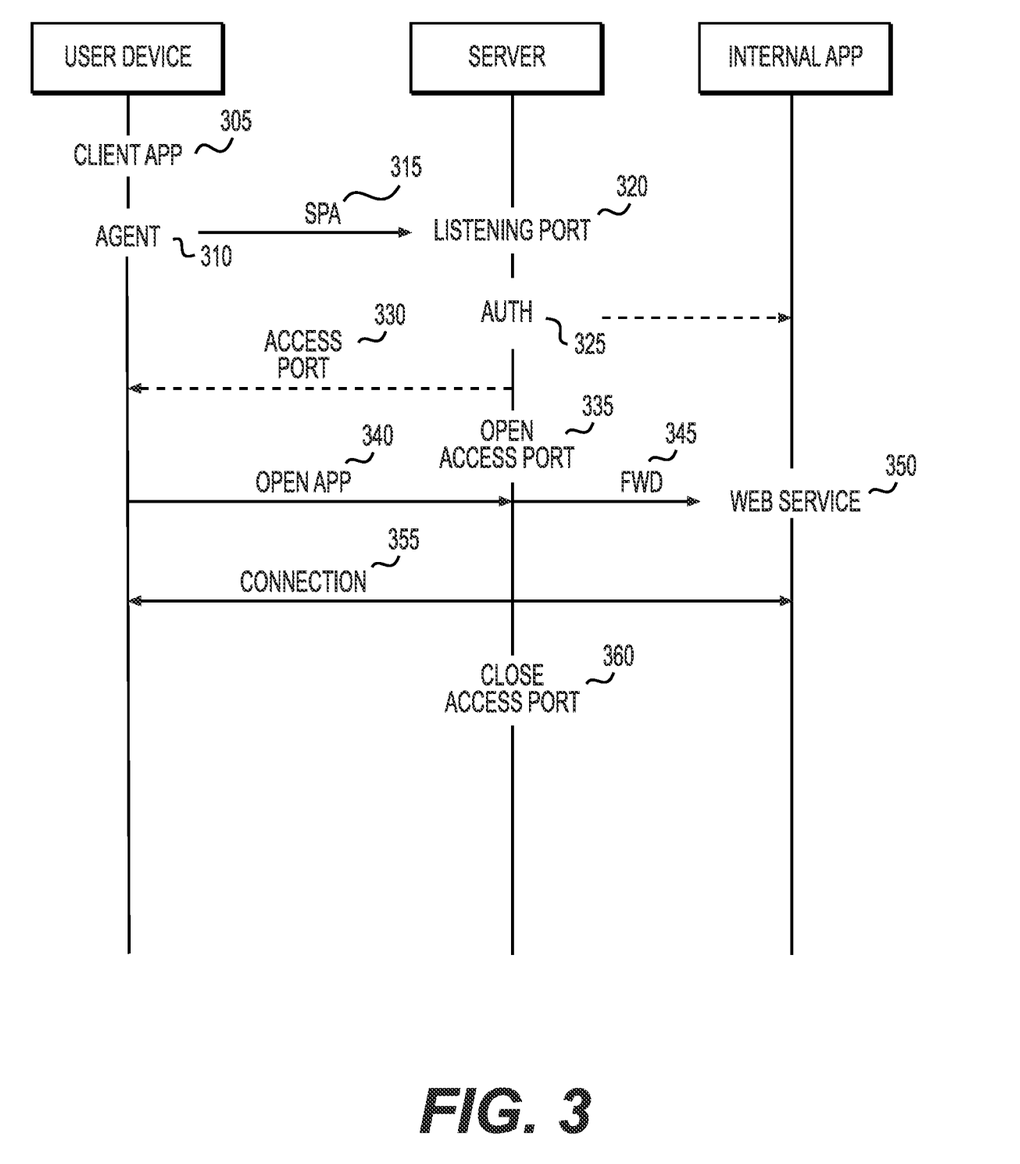
FIG. 3 is a sequence diagram of example steps for problem prioritization in a Telco cloud.

FIG. 3 is an example sequence diagram for concealing internal applications that are accessed over the internet. At stage 305, a user can select a client 112 for accessing an internal application 140 over the internet 128. This can include selecting an icon for the client 112 on the user device 110. In one example, the user device 110 can include a suite of managed applications that the user can access as part of enrollment in an EMM system. The suite can be accessed in a browser or on another client 112 that executes on the user device 110.

The client 110 can communicate with an agent 114 for purposes of accessing the internal application 140. In one example, the agent 114 can verify the identity of the user with an identity service. The agent 114 can also provide, for example, the icon for accessing the client at stage 305. The agent 114 can further enforce compliance policies, such as not allowing the user to access the internal application unless certain states or conditions are met at the user device 110.

At stage 310, the agent 114 can verify the user's identity, device compliance with an EMM policy, and ensure the user is allowed to access the internal application prior to sending the access request to the access server 130. In one example, the agent 114 can filter outgoing network requests. This can include using a filter driver, such as the WINDOWS Filtering Platform ("WFP") in an example. The filter driver can be installed at the user device 110 as part of enrollment. The filter driver can be part of a client-side SPA module, in an example. Upon authenticating with the EMM system, the user device 110 can receive a list of IP addresses that correspond to the internal applications 140. The list can be used by the filter driver, which can execute within the kernel of the OS in one example. When the user tries to access the client 112, the filter driver can recognize this activity. The filter driver can monitor all network activity on the device, in an example. The filter driver can then compare the IP address for the corresponding internal application 140 with the whitelist of authorized IP addresses. If a match is found, then the agent 114 can be notified.

The agent 114 can perform other verifications at stage 310, in an example. For example, the agent 114 can use publisher-based application policies to verify that the user device 110 is allowed to access the internal application 140. In one example, an administrator can use a console at the management server to specify publisher-based application policies as a constraint on contacting the access server 130. The agent 114 can then compare publisher details in an application's executable certificate to a whitelist of allowed applications. For example, the administrator can configure only applications from GOOGLE or MICROSOFT to connect to the access server 130. The filter driver can receive connection requests from all applications OR the endpoint (i.e., user device 110), in an example. These requests can include details like a process ID, which can be unique to an application instance and reveal who is issuing the connection request. If the destination IP matches the server IP, the filter driver can notify the client to send an SPA packet at stage 315. In one example, the agent can cache the publisher details of a process for future lookup. If the connection request is initiated by an application not in the whitelist, the filter driver can block the outgoing connection, in an example.

After one or more of these verifications, at stage 315, the client 112 can send an access request to a listening port of the access server 130 in an example. The agent 114 can send the access request on the client's 112 behalf. In one example, the access request is in the form of an SPA request. The agent 114 can send an encrypted SPA packet to an open listening port of the access server 130, where the SPA request can be received at stage 320. The SPA request sent at stage 315 can also include a random port number in an example. The client 112 can generate the port number that it will use to connect with the internal application 140, in an example.

The access server 130 can validate the access request at stage 325. This can include using a key pair, verifying a user ID, applying a key to a hash, or matching a random number. In one example, the user is verified at the internal application 140 as part of the authentication at stage 325.

As previously mentioned, the SPA request of stage 315 can identify a random port for use as the access port. If the SPA request is validated at stage 325, the access server 130 can open the random port as the access port at stage 335. The access server 130 need not notify the client 112 of this port opening in an example. Instead, because the client 112 supplies the random port number, it already knows which port number will correspond to the access port. The access server 130 can open the access port at stage 335 for a time interval. The client 112 (for example, using the agent 114) can then contact the open access port at stage 340 to request a connection to the internal application 140.

In an alternate example, the access server 130 can identify the access port to the client 112. This can include sending a reply at stage 330 based on authenticating the user at stage 325. The access port can be randomly generated within a range of possible access ports. The reply at stage 330 can identify the randomly selected access port to the user device 110.

At stage 335, the access server 130 can open the access port for client 112. In one example, this include creating a new access rule at the firewall. The access rule can identify the access port number and open the port for a time interval. The time interval can be based on settings configured at a console, in an example. In one example, the time interval is five seconds. However, if clients 112 are failing to connect to the internal application 140 due to port closure prior to establishing a connection, the administrator can lengthen the time interval, for example, to 15 seconds. The access rule can define the random port number as open for the time interval, automatically closing the port at the end of the time interval. But a default rule can allow established connections through the access port even when it is closed. Therefore, in an example, the randomized access port can establish new connections while open but maintain established connections while closed.

The access rule can be implemented with IP tables for routing a request to open the internal application at stage 340. When the request is received through the open access port, the IP tables can identify the location of the corresponding internal application 140, which can be a web service. At stage 345, the request can be forwarded to that internal application 140. A web service can receive the request at stage 350 and authenticate the user. The authentication can be based on credentials forwarded from the access server in stage 345, in an example. Then, the web service and client can establish a connection at stage 355.

At stage 360, the access port can close. This can occur when the time interval concludes. The access rule can then be deactivated or discarded, in an example. A default rule for a port range that includes the randomized access ports can maintain established connections while blocking attempts at new connections. In one example, a connection can have a status field that can be examined by the firewall. This can allow the firewall to determine whether to block a packet that arrives at the closed access port.

Figure 4:
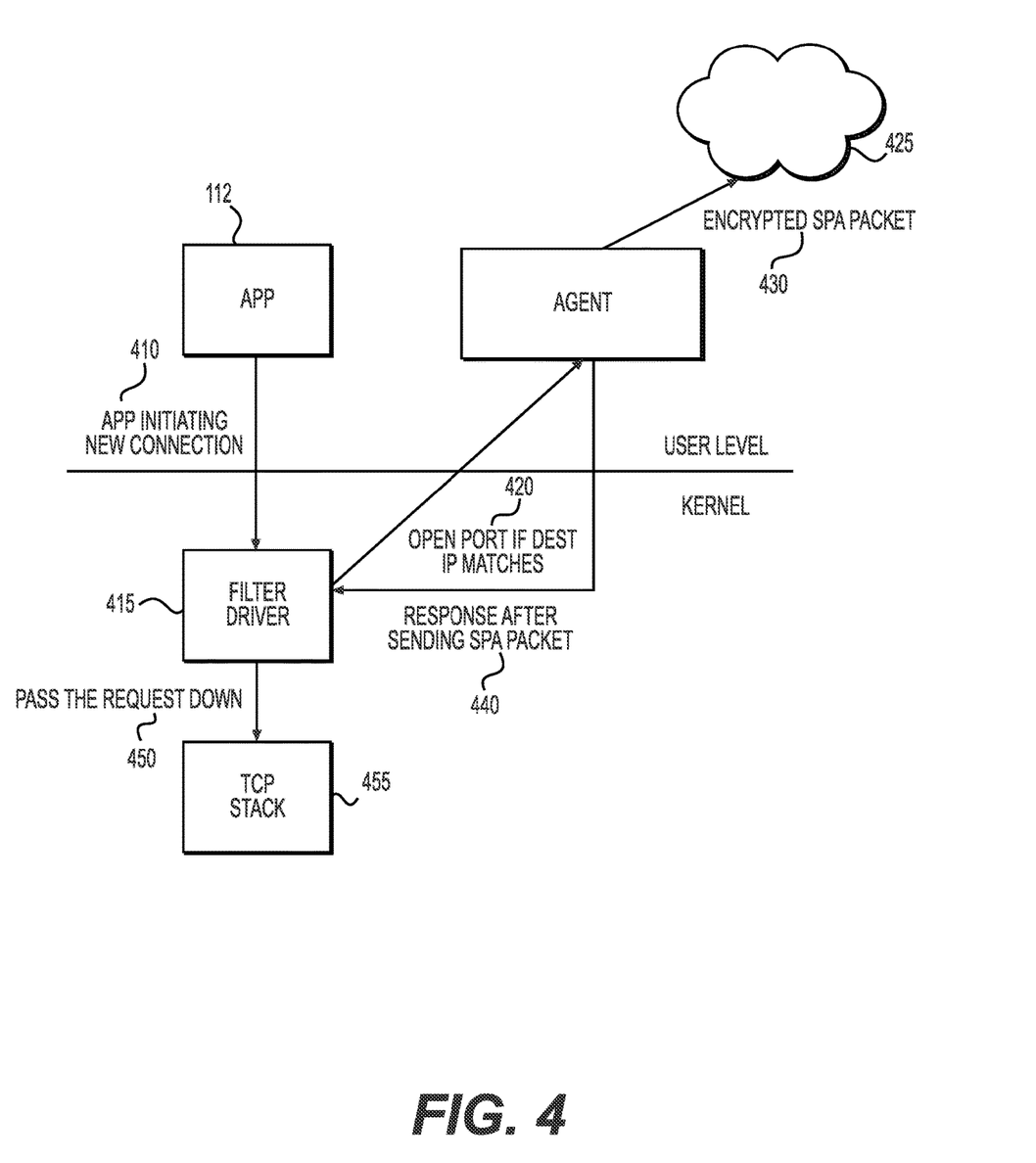
FIG. 4 is an example illustration of system components and stages executed at a user device for communications with the access server by a managed client application.

FIG. 4 is an example illustration of system components and stages executed at a user device for communications with the access server by a managed client application. At stage 410, the client 112 can filter outgoing network connection requests using a filter driver. For example, the client 112 can include multiple different internal applications for selection. The available application can be user specific, such as based on a user profile in the EMM system. Certain jobs can require access to different applications, which can be specified in the user profile or based on a group that the user is assigned to.

When the user selects an application at the client 112, the client 112 can request a new network connection with the filter driver. The filter driver can be a WFP driver in an example. It can be installed on the user device 110 as part of enrollment in the EMM system. The filter driver can run in the kernel of the OS in an example. Conversely, the client 112 can run at the user level as one or more applications.

At stage 415, the fitter driver can attempt to match the new network connection against IP addresses stored in the kernel. These IP addresses can be supplied by a management server in the EMM system and can represent the address of internal applications that the user is allowed to access. For example, the IP addresses can be addresses of one or more access servers 130 that give the user device 110 access to the internal applications 140. Again, these addresses can be different for different users, reflecting the different applications that those users are allowed to access. For example, the agent 114 can receive the allowed IP addresses from a management server and then supply the allowed IP addresses to the filter driver. When the client 112 requests access to an internal application, the client 112 can supply a corresponding IP address to the filter driver. The filter driver can attempt to match the IP address from the client 112 against allowed IP addresses in the IP table.

Because the filter driver can run in the OS kernel and monitor connection requests in an example, it can see many IP addresses. A matching IP address can indicate a managed application and cause the agent to open a port at stage 240. For example, if a work application is used by the user from a home location, the filter driver at the user device can cause the agent to open a port for the work application's corresponding IP addresses. However, if an IP address does not match, then the filter driver can simply pass the request down to the TCP stack at stage 450.

If a match does exist, then at stage 420 the filter driver can pass the corresponding IP address to the agent 114 so that the agent 114 can request an open port at the access server 130. At stage 430, the agent 114 can send an access request to the access server 130 using the IP address. The access request can be in the form of an encrypted SPA packet. The agent can include SPA functionality so that the client 112 can connect to the internal application 140 without the internal application 140 or the client 112 needing to be rewritten to use SPA, in an example. In one example, the SPA packet can identify the user, include a shared secret for validation by the access server 130, and include a random port number to use for establishing the connection with the internal application 140. The SPA request can include an encrypted shared key and HMAC key, both of which can also be added to the access server's 130 configuration. The access server 130 can also include a list of commands that are available for passing to the internal applications 140, such as for establishing a connection.

At stage 440, the agent 114 can notify the filter driver that the SPA request was sent to open an access port. The agent can pass the randomized port number to the filter driver, in an example. Then, at stage 450, the filter driver can pass the access request to a portion of the OS that is responsible for making the connection with the internal application 140. This can be a transmission control protocol ("TCP") stack, in one example. At stage 455, the TCP stack can then establish a connection with the internal application by using the IP address and the port number for the access port.

If the access server 130 validated the user and opened the access port for the requesting device then the access server 130 can receive the connection request from the TCP stack and, by proxy, establish the connection between the user device 110 and the internal application 140. The internal application 140 can ask for user authentication, such as a username and password, multi-factor authentication, or certificate authentication.

Figure 5:
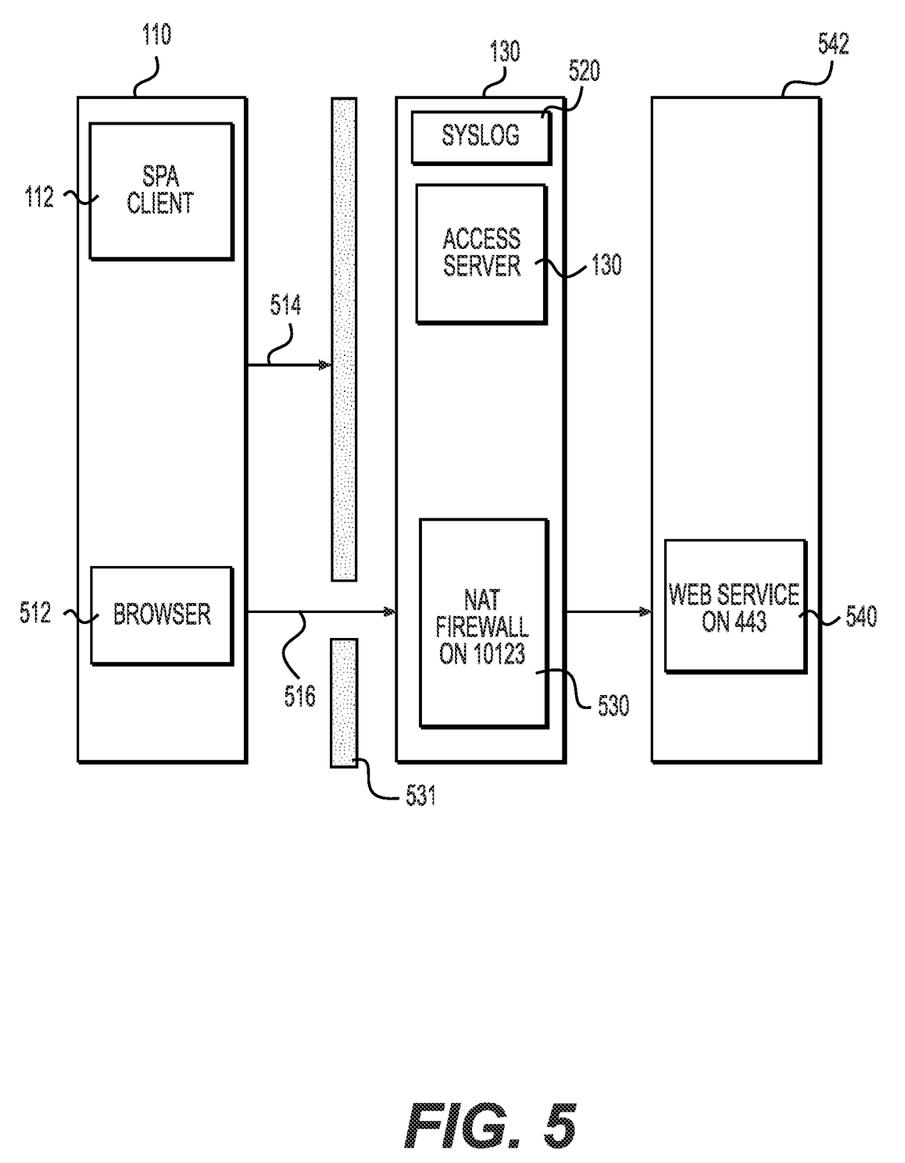
FIG. 5 is an example system diagram including components for providing access to internal applications in a cloud from over a network.

FIG. 5 is an example system diagram including components for providing access to internal applications in a cloud from over a network. In one example, a client 112 on a user device 110 can send an SPA request to a listening port of an access server 130. The listening port can be known beforehand at the user device 110 and configured beforehand at the access server 130. For example, the listening port can be identified in address information for allowed applications at the user device 110, which can be supplied by a management server in an EMM system. A firewall 531 for the access server 130 can be configured with the listening port set to open.

The SPA request of stage 514, which can be sent by the agent 114, can include a random port number to use as an access port. The random port number can be from 10,000 to 65,535 in an example. In the example of FIG. 5, the SPA request can identify port number 10123 for use as the access port. The access server 130 can open access port 10123 for a temporary interval, such as five seconds. During that time, the access server 130 can be accessed for network address translation ("NAT") operations. The access server 130 can be configured to only perform NAT operations based on communications received in the range of ports that can be access ports. This can prevent access to internal applications from the listening port. Therefore, while the listening port can be used for SPA authentication, a destination port in the access port range can be used for NAT operations. The access server 130 can use the NAT operations to establish the connection by proxy to the internal services 540. One or more such internal services 540 can be available at a web server 542 that is available by proxy through the access server 130.

Having knocked for the access port, the client 112 can request connection to the internal service 540 at stage 516. In the example of FIG. 5, the TCP stack of the user device 112 can establish a connection with a browser 512, which is one type of client. Because the firewall 531 is temporarily open at port 10123, the connection request can be received at the access server 130 through that access port.

Then, at stage 530, acting as a proxy, the access server 130 maintain a connection with an internal service 540 corresponding to the internal application. This can include translating and routing the communications received at port 10123 to a web server 542 at a port where the web service 540 is listening. In this example, the web service 540 is listening at port 443 of web server 542. To perform the translation, NAT tables and operations can be used in an example.

The HMAC, which can be a hashed machine address for the user device, can be stored in the syslog 520. The syslog 520 can communicate with a logging server or itself can include a logging server. In general, the syslog 520 can be used to log events that occur at the access server 130. The syslog 520 can listen for certain events related to the SPA authorizations and connections to the internal applications. These events can be captured in a database for future administrative review or for surfacing potential problems or attacks.

The access server 130 and web server 542 can be remote from one another in an example, such as at different cloud locations. The access server 130, using NAT operations, can exchange encrypted data with the web server 542, in an example. When a connection is established by proxy between the client 112, 512 of the user device 110 and the web service 540 for the internal application, the connection can appear seamless between the two endpoints even though the access server 130 stands in the middle as a proxy.

The access server 130 and web server 542 can each include one or more servers. Each server can include one or more processors. These can be physical servers, in an example. Alternatively, they can be virtual servers, such as VMs, that run on top of physical devices.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for accessing hidden internal applications over a network, comprising:

receiving an access request at an access server for accessing an internal application, the access request being received at a listening port from a user device, wherein the access request includes a random number generated by the user device, and wherein the access request is received after determining that the user device is in compliance with an enterprise mobility management ("EMM") policy;

in response to validating the access request, opening fora time interval an access port in a firewall for accessing the internal application, wherein the access port is selected based on the random number and is different than the listening port;

establishing a connection between the user device and the internal application based on communication through the open access port during the time interval; and closing the access port while allowing the established connection to persist.

2. The method of claim 1, further comprising validating the access request prior to opening the access port, wherein the access port is unknown to the user device prior to generation of the random number.

3. The method of claim 1, wherein the access port closes after a time interval.

4. The method of claim 1, wherein the access request includes a single packet authorization ("SPA"), the SPA being used to determine whether the user device is authorized to access the internal application.

5. The method of claim 1, wherein the access request includes a destination internet protocol ("IP") address based on which application is selected for access at the user device, wherein an agent on the user device sends the access request after determining that the user device is in compliance with the enterprise mobility management ("EMM") policy.

6. The method of claim 5, wherein the access request is sent to a port determined by a filter driver on the user device, wherein the filter driver looks up the IP address in a table of allowed IP addresses prior to the user device sending the access request.

7. The method of claim 1, wherein the access request is received from an agent that executes on the user device, wherein the agent generates the random number and checks a selected application against a whitelist of allowed applications before sending the access request.

8. A non-transitory, computer-readable medium comprising instructions that, when executed by a processor, cause the processor to perform stages for accessing hidden receiving an access request at an access server for accessing an internal application, the access request being received at a listening port from a user device, wherein the access request includes a random number generated by the user device, and wherein the access request is received after determining that the user device is in compliance with an enterprise mobility management ("EMM") policy;

in response to validating the access request, opening for a time interval an access port in a firewall for accessing the internal application, wherein the access port is selected based on the random number and is different than the listening port;

establishing a connection between the user device and the internal application based on communication through the open access port during the time interval; and closing the access port while allowing the established connection to persist.

9. The non-transitory, computer-readable medium of claim 8, the stages further comprising validating the access request prior to opening the access port, wherein the access port is unknown to the user device prior to generation of the random number.

10. The non-transitory, computer-readable medium of claim 8, wherein the access port closes after a time interval.

11. The non-transitory, computer-readable medium of claim 8, wherein the access request includes a single packet authorization ("SPA"), the SPA being used to determine whether the user device is authorized to access the internal application.

12. The non-transitory, computer-readable medium of claim 8, wherein the access request includes a destination internet protocol ("IP") address based on which application is selected for access at the user device, wherein an agent on the user device sends the access request after determining that the user device is in compliance with the enterprise mobility management ("EMM") policy.

13. The non-transitory, computer-readable medium of claim 12, wherein the access request is sent to a port determined by a filter driver on the user device, wherein the filter driver looks up the IP address in a table of allowed IP addresses prior to the user device sending the access request.

14. The non-transitory, computer-readable medium of claim 8, wherein the access request is received from an agent that executes on the user device, wherein the agent generates the random number and checks a selected application against a whitelist of allowed applications before sending the access request.

15. A system for accessing hidden internal applications over a network, comprising:

a non-transitory, computer-readable medium containing instructions; and a processor that executes the instructions to perform stages comprising: receiving an access request at an access server for accessing an internal application, the access request being received at a listening port from a user device, wherein the access request includes a random number generated by the user device, and wherein the access request is received after determining that the user device is in compliance with an enterprise mobility management ("EMM") policy;

in response to validating the access request, opening for a time interval an access port in a firewall for accessing the internal application, wherein the access port is selected based on the random number and is different than the listening port;

establishing a connection between the user device and the internal application based on communication through the open access port during the time interval; and closing the access port while allowing the established connection to persist.

16. The system of claim 15, the stages further comprising validating the access request prior to opening the access port, wherein the access port is unknown to the user device prior to generation of the random number.

17. The system of claim 15, wherein the access port closes after a time interval.

18. The system of claim 15, wherein the access request includes a single packet authorization ("SPA"), the SPA being used to determine whether the user device is authorized to access the internal application.

19. The system of claim 15, wherein the access request includes a destination internet protocol ("IP") address based on which application is selected for access at the user device, wherein an agent on the user device sends the access request after determining that the user device is in compliance with the enterprise mobility management ("EMM") policy.

20. The system of claim 19, wherein the access request is sent to a port determined by a filter driver on the user device, wherein the filter driver looks up the IP address in a table of allowed IP addresses prior to the user device sending the access request.

* * * * *